(12) United States Patent
Kohno

(10) Patent No.: US 7,375,898 B2
(45) Date of Patent: May 20, 2008

(54) OPTICAL DEVICE, OPTICAL UNIT AND IMAGER

(75) Inventor: Shinichi Kohno, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/700,225

(22) Filed: Jan. 31, 2007

(65) Prior Publication Data

US 2007/0236802 A1    Oct. 11, 2007

(30) Foreign Application Priority Data

Feb. 1, 2006    (JP) .......................... P2006-024411

(51) Int. Cl.
*G02B 1/06* (2006.01)

(52) U.S. Cl. .................. 359/665; 359/666; 359/667

(58) Field of Classification Search ......... 359/665–667
See application file for complete search history.

(56) References Cited

U.S. PATENT DOCUMENTS

| 5,130,839 | A | 7/1992 | Tomita |
| 7,224,534 | B2 * | 5/2007 | Ootsuka et al. ............. 359/665 |

FOREIGN PATENT DOCUMENTS

| DE | 10 2006 012 687 A1 | 3/2006 |
| JP | 2005-62864 A | 3/2005 |
| WO | WO-2005/103768 A2 | 11/2005 |

OTHER PUBLICATIONS

"Philips' Fluid Lenses," Digital Photography Review, Mar. 3, 2004.
XP-002431660 Temperature Compensation Analysis of liquid Lens for Variable-Focus Control Department of Machatronics Engineering/National Changhua University of Education.
XP-002431661 Graft Architectural Effects on Thermoresponsive Wettability Changes of Poly(N-isopropylacrylamide)-Modified surfaces Department of Applied Chemistry, Faculty of Science and Technology, Waseda University, Institute of Biomedical Engineering, Tokyo Women's Medical University.
U.S. Appl. No. 10/248,651, filed Aug. 5, 2004, Zribi.

* cited by examiner

*Primary Examiner*—Evelyn A. Lester
(74) *Attorney, Agent, or Firm*—Birch, Stewart, Kolasch & Birch LLP

(57) ABSTRACT

An optical device comprises: a liquid container that contains water-based liquid and oil-based liquid that are different in refractive index from each other and immiscible with each other to have respective optical-transmission properties so that light can transmit in a predetermined optical-axis direction; a coat film that covers at least part of an inner surface of the liquid container and has a hydrophilic/hydrophobic property changing with temperature; and a temperature regulator that regulates temperature of the coat film.

7 Claims, 7 Drawing Sheets

OPTICAL DEVICE, OPTICAL UNIT AND IMAGER

BACKGROUND OF THE INVENTION

1. Field of the Invention

The present invention relates to an optical device and optical unit transmissive of light, and to an imager capable of generating an image signal through focusing the light of from a subject.

2. Description of the Related Art

Recently, it is popular to incorporate an imager, capable of acquiring a digital photographic image by taking a picture of a subject, in a small-sized appliance such as a cellular phone or a PDA (personal digital assistant). By providing an imager on a small-sized appliance carried at all times, shooting is available at any time in a manner freely from carrying a digital or video camera in the related art.

Meanwhile, the endoscope is usually used at the medical site, to insert a small-sized imager in the body cavity and take images of the body interior. It is a recent practice to excise, at the site, a lump, etc. found upon photographing, by use of the excision tool attached on the endoscope. The endoscope draws an increasing demands as a medical device relieved of the burden on the human body.

It is the recent tendency toward using an imager considerably smaller in size as compared to the usual digital camera, as described above. The photographic image, as taken by the small-sized imager, is under improvement in quality by virtue of the development of small-sized CCDs high in pixel density and small-sized lenses improved in contrast. As for the problems left, there is a strong desire to mount a small-sized imager with such auto-focus and zoom functions as mounted as standard on the usual digital camera.

Auto focus and zoom functions are generally realized by moving a plurality of lenses in a direction along the optical axis (hereinafter, the direction along the optical axis is referred to as a front-rear direction) in the imager. However, in the small-sized imager for use in an endoscope, there is a difficulty in moving the lens within the imager or arranging a massive motor or cam mechanism to drive the lens.

In relation to this, there is proposed a liquid lens that the focal length can be changed by changing a liquid-surface form under the application of a voltage to an electrically-conductive liquid (see JP-A-2005-62864 and "Philips' Fluid Lenses, [online], Mar. 3, 2004, Royal Philips Electronics, [searched on Mar. 31, 2004], the Internet <URL: http://www.dpreview.com/news/0403/04030302philipsfluidlens.as p>, for example). For example, "Philips' Fluid Lenses, [online], Mar. 3, 2004, Royal Philips Electronics, [searched on Mar. 31, 2004], the Internet <URL: http://www.dpreview.com/news/0403/04030302philipsfluidlens.as p> describes a liquid lens structured with a tube having an inner wall covered with a water-repellent coating, a conductive water-based liquid and non-conductive oil-based liquid sealed in the tube, and an electrode for applying an electric field to the water-based liquid in the tube. In the liquid lens, the water-based liquid is a semispherical solid in the state no voltage is applied to the conductive water-based liquid, so that the water-based liquid and the oil have an interface assuming a convex form. The interfaces changes from the convex to a concave depending upon the magnitude of an electric field applied to the conductive water-based liquid. For this reason, radius-of-curvature varies as a lens thus enabling to change the focal length without restriction.

With such a liquid lens, focal length can be changed without moving the lens. Without providing a motor or cam mechanism as mentioned before, zoom and focus functions can be realized. Accordingly, the apparatus can be greatly reduced in size, and hence applied to a small-sized appliance, such as a cellular phone or an endoscope.

However, according to the liquid lens described in JP-A-2005-62864 or "Philips' Fluid Lenses, [online], Mar. 3, 2004, Royal Philips Electronics, [searched on Mar. 31, 2004], the Internet <URL: http://www.dpreview.com/news/0403/04030302philipsfluidlens.as p>, the conductive solution might be electrolyzed by the charge released from the electrode. Where used over a long term, the produced gas builds up into bubbles within the liquid container thus resulting in a problem that light scatter takes place to lower the transmittance of light.

This problem is generally true for the optical elements, such as parallel plates and prisms, without limited to the lens.

SUMMARY OF THE INVENTION

It is an object of the present invention to provide an optical device, optical unit and imager that the refractive power is to be changed without restriction while suppressing the performance from deteriorating.

An optical device according to the invention, for achieving the foregoing object, comprises:

a liquid container that contains water-based liquid and oil-based liquid that are different in refractive index from each other and immiscible with each other to have respective optical-transmission properties so that light can transmit at least in a predetermined optical-axis direction;

a coat film that covers at least part of an inner surface of the liquid container and has a hydrophilic/hydrophobic property changing with temperature; and a temperature regulator that regulates temperature of the coat film.

According to the optical device of the invention, by regulating the temperature of the coat film, the hydrophilic/hydrophobic property of the coat film is changed to change the form of the boundary plane of between the water-based liquid and the oil-based liquid. Recently, there is known a small-sized temperature regulator using a Peltier device or the like. By using such a small-sized temperature regulator, the refractive power on the optical device can be changed freely while suppressing the device from increasing in size. Meanwhile, according to the optical device of the invention, the boundary plane form of between the water-based liquid and the oil-based liquid is changed without releasing the charge to the water-based and oil-based liquids. This can avoid the disadvantage that the liquid is electrolyzed to cause bubbles, thus maintaining the optical-transmission property over a long term.

Meanwhile, in the optical device of the invention, the liquid container comprises: a first portion arranged in contact with the coat film and comprising a material having a comparatively higher thermal conductivity; and a second portion covering over an outer surface of the first portion and comprising a material having a comparatively lower thermal conductivity.

By contacting the first portion having a comparatively higher thermal conductivity with the coat film, the heat generated at the temperature regulator is efficiently transferred to the coat film. By covering the first portion with the second portion formed of a material having a comparatively lower thermal conductivity (i.e. heat-insulation material), the disadvantage the generated heat leaks can be prevented. Accordingly, the coat film is regulated with efficiency, thus accurately changing the boundary plane form of between the water-based liquid and the oil-based liquid.

Meanwhile, in the optical device of the invention, the temperature regulator comprises: a Peltier device that releases and absorbs heat due to current supply and an electrode that supplies a current to the Peltier device.

Recently, a Peltier device (thermo-module) is known that utilizes the Peltier effect that, by supplying a current to a circuit joining together materials having different thermo-electric powers from each other, heat generation takes place at one point of the junctions thereof while heat absorption occurs at the other point (see the Internet <URL: http://www.scnt.co.jp/kakushin.pdf>, for example). According to the optical device in a preferred embodiment of the invention, the temperature of the coat film can be regulated by changing the direction and amount of current supply to the Peltier device, thus accurately controlling the refractive power of the optical device by means of a simple mechanism.

Meanwhile, in the optical device of the invention, the coat film comprises poly-N-isopropyl acrylamide polymer (PNIPAAm).

PNIPAAm, having a characteristic that the hydrophilic/hydrophobic property changes with temperature, is known as a cell-separation material in the medical field (see JP-A-H7-129508, the Internet <URL: http://vweb.yz.yamagata-u.ac.jp/k5/theme/pnipaam0310.pdf>, <URL: http://www.nitto.co.jp/rd/technical/2004_85/pdf/2004_85_11.pdf>, for example). This PNIPAAm is preferably applicable as the coat film referred in the invention because of its excellent temperature responsibility.

An optical unit according to the invention, for achieving the foregoing object, comprises:

a liquid container that contains water-based liquid and oil-based liquid that are different in refractive index from each other and immiscible with each other to have respective optical-transmission properties so that light can transmit at least in a predetermined optical-axis direction;

a coat film that covers at least part of an inner surface of the liquid container and has a hydrophilic/hydrophobic property changing with temperature;

a temperature regulator that regulates temperature of the coat film; and a control section that causes a form change in a boundary plane of between the water-based liquid and the oil-based liquid under control of temperature of the coat film regulated by the temperature regulator.

According to the optical unit of the invention, the refractive power can be changed freely wherein the optical transmission property can be maintained over a long term.

Incidentally, concerning the optical unit referred in the invention, nothing is disclosed herein but showing the basic form thereof. This is simply because to avoid duplication. The optical unit referred in the invention is not limited to the basic form but includes various forms corresponding to the foregoing various forms of the optical device.

Meanwhile, an imager according to the invention, for achieving the foregoing object, comprises:

a liquid container that contains water-based liquid and oil-based liquid that are different in refractive index from each other and immiscible with each other to have respective optical-transmission properties so that light can transmit at least in a predetermined optical-axis direction;

a coat film that covers at least part of an inner surface of the liquid container and has a hydrophilic/hydrophobic property changing with temperature;

a temperature regulator that regulates temperature of the coat film;

a control section that causes a form change in a boundary plane of between the water-based liquid and the oil-based liquid under control of temperature of the coat film regulated by the temperature regulator; and an imaging section, in which light of from a subject traveled through the water-based liquid and the oil-based liquid are focused, that generates an image signal corresponding to the light of from the subject.

According to the imager of the invention, auto-focus and zoom functions can be realized while suppressing the apparatus from increasing in size.

Incidentally, concerning the imager referred in the invention, nothing is disclosed herein but showing the basic form thereof. This is simply because to avoid duplication. The imager referred in the invention is not limited to the basic form but includes various forms corresponding to the foregoing various forms of the optical device.

DETAILED DESCRIPTION OF THE INVENTION

With reference to the drawings, embodiments of the present invention will now be explained.

Figure 1:
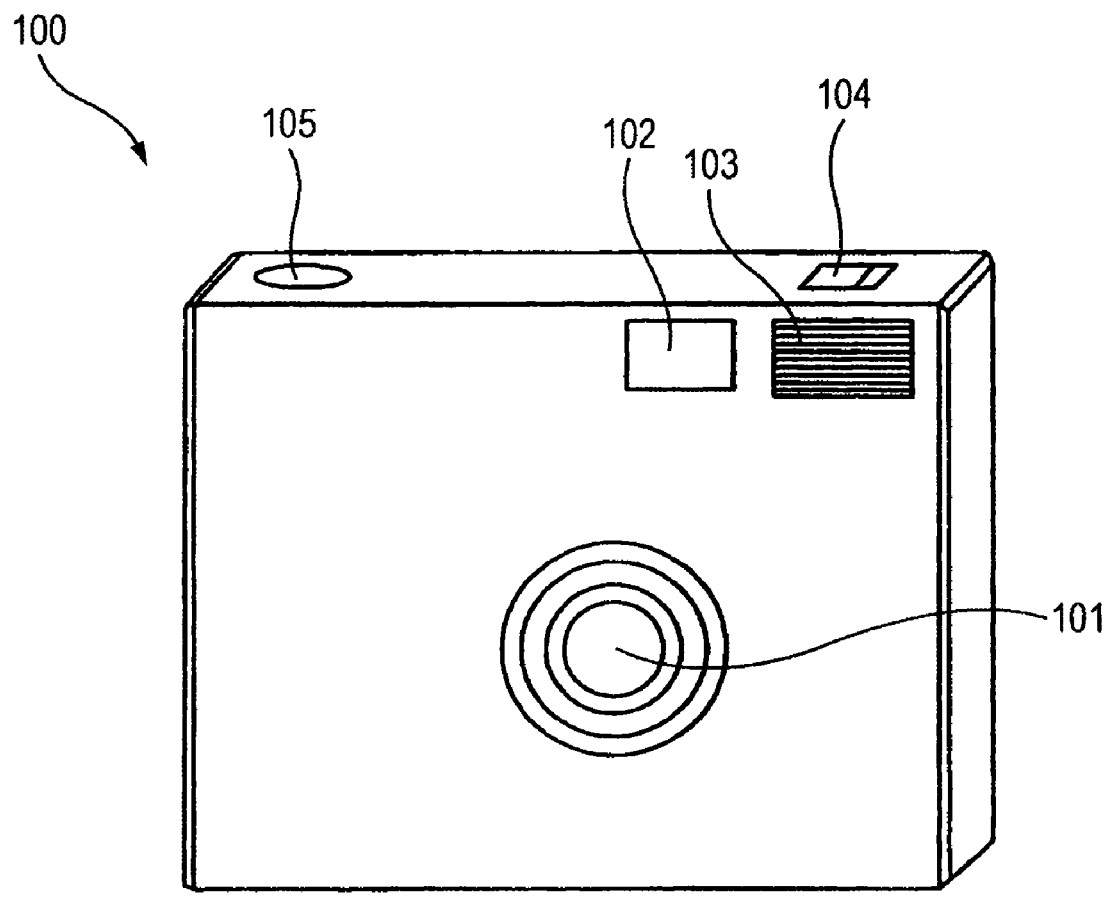
FIG. 1 is an exterior perspective view of a digital camera, to which one embodiment of the present invention is applied, from obliquely upper front.

FIG. 1 is an exterior perspective view, as viewed from upper front, of a digital camera to which one embodiment of the invention is applied.

The digital camera 100 has, at its top surface, a shutter-release button 105 to press when taking a picture, and a power switch 104 of a slide type, as shown in FIG. 1. In the front surface of the digital camera 100, there are provided a photographic lens 101 structured with a zoom lens capable of changing the photographic angle of view and a focus lens for focusing on a subject, an optical-viewfinder window 102 for the person taking a picture to view so that he/she can determine a scene of a subject, and a flash unit 103 that emits light synchronously with the pressing of the shutter-release button 105. Meanwhile, in the backside of the digital camera 100, there are provided a display screen to display a menu screen or an image to take, a cross key to set up an photographic angle of view and a picture-taking mode, and so on.

Figure 2:
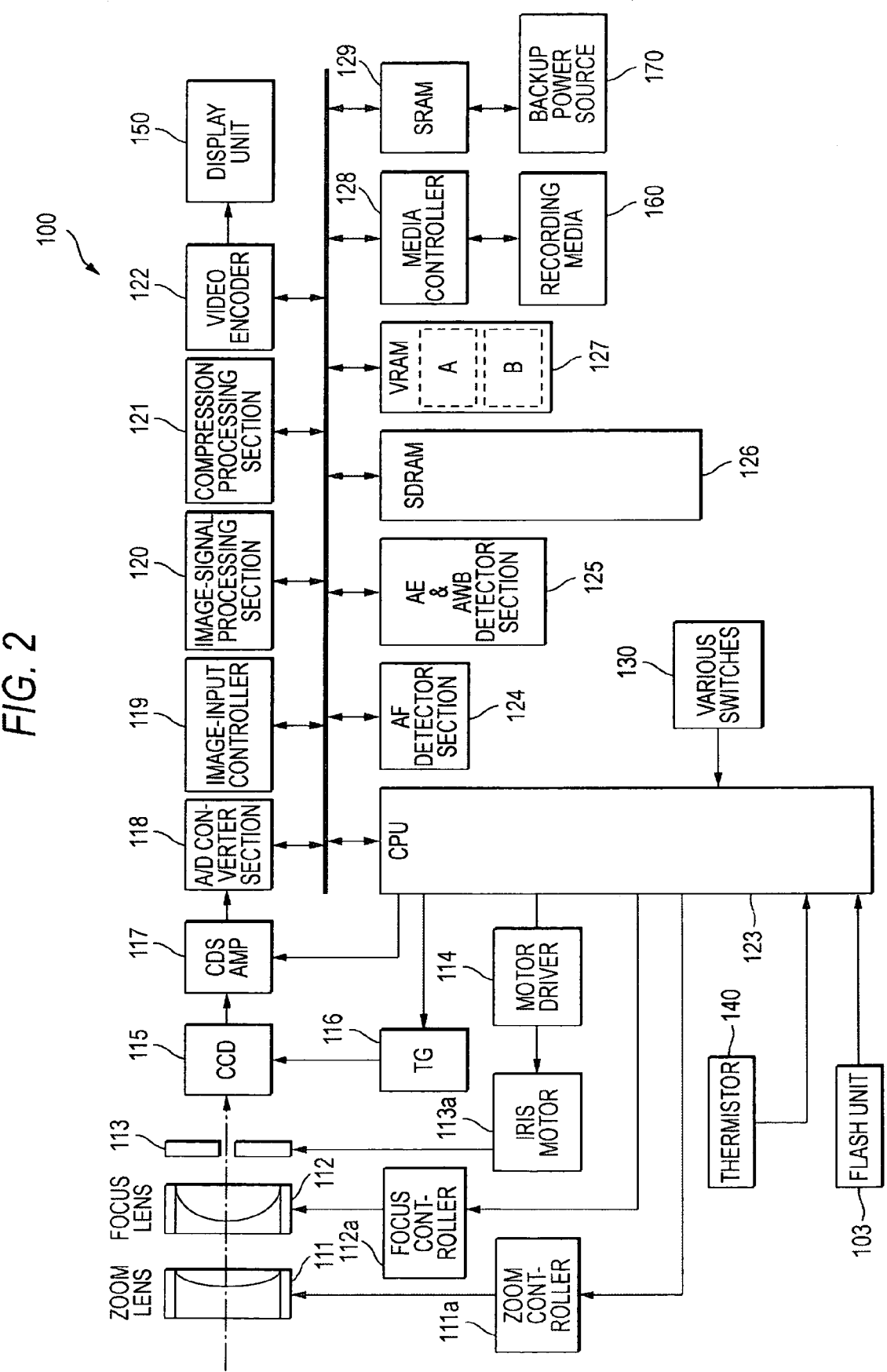
FIG. 2 is an internal block diagram of the digital camera shown in FIG. 1.

FIG. 2 is an internal block diagram of the digital camera 100 shown in FIG. 1.

The digital camera 100 is arranged with a zoom lens 111, a zoom controller 111a, a focus lens 112, a focus controller 112a, an iris 113, an iris motor 113a, a motor driver 114, a CCD (charge coupled device) 115, a TG (timing generator) 116, a CDS/AMP 117, an A/D (analog/digital) converter section 118, an image-input controller 119, an image processing section 120, a compression-processing section 121, a video encoder 122, a CPU 123, an AF detector section 124, an AE & AWB detector section 125, an SDRAM 126, a VRAM 127, a media controller 128, an SRAM 129, various switches 130, a thermistor 140, a flash unit 103, a display unit 150, and a backup power source 170.

In the digital camera 100, the light from the subject enters from left as viewed in FIG. 2 and travels through the zoom lens 111 and the focus lens 112 into the iris 113 that regulates the amount of light of from the subject, thus being focused on the CCD 115. The photographic lens, in its nature, is structured with a plurality of lenses, at least one of which lenses is largely involved in focal adjustment wherein the relative position of the lenses is determinative for the focal length thereof. Instead, FIG. 2 typically shows, as a zoom lens, those lenses involved in changing the focal length and, as a focus lens, those lenses involved in focal adjustment.

The iris 113 is driven and moved by the iris motor 113a. For the zoom lens 111 and the focus lens 112, a zoom controller 111a and a focus controller 112a are respectively provided to change the shapes thereof, instead of the provision of a motor. The instruction, for operating the iris motor 113a, is forwarded from the CPU 123 through the motor driver 114. The instruction, for operating the zoom controller 111a and focus controller 112a, is forwarded directly from the CPU 123. The zoom lens 111 and the focus lens 112 correspond respectively to the optical devices referred in the invention. The CPU 123 together with the zoom controller 111a as well as the CPU 123 together with the focus controller 112a correspond respectively to examples of the control section referred in the invention.

The zoom lens 111 is a lens for realizing the zoom function to set up a photographic angle of view. The zoom function is generally realized by moving the zoom lens in a direction along the optical axis and adjusting the relative position of a plurality of lenses constituting the photographic lens. In this embodiment, instead of actually moving the zoom lens 111, the zoom controller 112a changes the form of the zoom lens 111, thereby adjusting the focal length and establishing the photographic angle of view.

The focus lens 112 is a lens for realizing the TTLAF (through the lens auto focus) to perform auto focusing on the subject. The TTLAF function generally include to detect a contrast in an image signal obtained by the CCD while moving the focus lens in a direction along the optical axis and to adjust the focus lens to a focal point by taking the lens position the contrast attains its peak as a focal point. In this embodiment, instead of moving the focus lens 112, the focus controller 112a changes the form of the focus lens 112, thereby effecting a focusing on the subject.

The structure of the zoom lens 111 and focus lens 112 as well as the method of changing the lens form thereof will be detailed later.

The iris 113 is regulated based upon the light intensity of the subject as detected by the AE & AWB detector section 125, thereby regulating the amount of light of from the subject.

The CCD 115 receives the light of from the subject and reads a subject image given by the light as an analog subject-related signal. In the digital camera 100, even prior to the main photographing of taking a picture of the subject by pressing the FIG. 1 shutter-release button 105, a temporary image data is generated with low resolution (hereinafter, low-resolution temporary image data is referred to as low-resolution data) in order to execute the AF function or display a through-image. The subject-related signal generated by the CCD 115 is outputted as it is to the CDS/AMP 117 when the shutter-release button 105 is pressed. Prior to the main photographing, it is outputted to the CDS/AMP 117 by being thinned out for low-resolution data in every timing synchronous with the signal issued from the TG 116. The CCD 115 corresponds to an example of the imaging section referred in the invention.

The CDS/AMP 117 amplifies the subject-related signal and controls the gain thereof. The A/D converter section 118 converts the subject-related signal into digital image data. Because the CCD 115 generates a thinned subject-related signal in every predetermined timing as mentioned before, the A/D converter section 118 continuously generates low-resolution data in every predetermined timing. The low-resolution data is delivered through the image-input collector 119 to the AF detector section 124, the AE & AWB detector section 125 and the image-signal processing section 120. The low-resolution data forwarded to the image-signal processing section 120 is subjected to predetermined image processing (referred later) and then forwarded to the video encoder 122 where the data form is converted and then forwarded to the display unit 150. Thus, a through-image is displayed on a display screen provided in the backside of the digital camera 100. Meanwhile, the image data generated upon the main photographing (hereinafter, the image data generated upon the main photographing is referred to as photographic image data) is once forwarded to the SDRAM 126 through the image-input controller 119.

Thee digital camera 100 is stored with a program to be executed within the digital camera 100. Besides, there are provided three memories, i.e. a high-speed-recording SDRAM 126 for use as an intermediate buffer, an SRAM 129 that are data-storage memory stored with the data for various menu screens and user's settings, and a VRAM 127 to store compressed image data. The VRAM 127 is divided with two areas, to store image data in an area A and an area B in order. The stored image data is read, in order, to a video encoder 122 or to a media controller 128.

The AE & AWB detector section 125 detects the brightness and white balance of the subject depending upon the low-resolution data sent from the image-input controller 119.

The AF detector section 124 detects the contrast in the photographic image depending upon the low-resolution data sent from the image-input controller 119. The contrast detected is forwarded to the CPU 123.

The CPU 123 is informed of the settings established at various switches, such as the shutter-release button 105 and power switch 104, and takes control of various elements of the digital camera according to the settings. Meanwhile, the CPU 123 determines the shutter speed and aperture value depending upon the brightness of the subject as determined by the AE & AWB detector section 125, and determines the focal point of the focus lens 112 depending upon the contrast detected by the AF detector section 124.

The photographic image data, generated upon the main photographing and stored in the SDRAM 126, is acquired by the image-signal processing section 120 according to the instruction of from the CPU 123. The image-signal processing section 120 subjects the photographic image data to RGB-level adjustment and gamma adjustment and forwards the photographic image data thus image-processed to the compression processing section 121. The compression processing section 121 subjects the photographic image data to compression processing and forwards the compressed photographic image data to the VRAM 127. According to the instruction of from the CPU 123, the video encoder 122 acquires the compressed photographic image data from the VRAM 127 and converts the compressed photographic data into a data form that can display the photographic image data on the display screen. The converted photographic image data is forwarded to the display unit 150. The display unit 150 displays the photographic image represented by the photographic image data, on the display screen. The media controller 128 takes control of recording and reading of the photographic image data to and from the recording media 160.

The digital camera 100 in this embodiment is basically structured as described above.

Here, the digital camera 100 in the invention is characterized in the zoom lens 111 and the focus lens 112. Because the zoom lens 111 and the focus lens 112 are nearly similar in structure, explanation will be made in detail on the focus lens 112 on behalf thereof.

FIG. 3 is a schematic structural view of the focus lens. Note that, in FIG. 3, the light from the subject enters leftward in a direction of the arrow O wherein explanation is made by taking the side where light is incident (left in the figure) as the front and the side where light exits (right in the figure) as the rear.

The focus lens 112 is formed by containing a water-based liquid 201 and an oil-based liquid 202 immiscible with the water-based liquid 201, in a liquid container 200.

The liquid container 200 is structured with a wall 210 having an outer surface cylindrical in form and an inner surface frustum in form, and caps 231, 232 closing the wall 210 at both ends. The caps 231, 232 are structured of transparent glass while the wall 210 is formed of a material well in thermal conductivity. The material, making up the wall 210, preferably uses a metal material, particularly copper (having a thermal conductivity of 403 [W/m·K] at a temperature of 0 [° C.]), aluminum (having a thermal conductivity of 236 [W/m·K] at a temperature of 0 [° C.]), or an alloy including those. The liquid container 200 corresponds to an example of the liquid container referred in the invention.

The wall 210 is covered, at its outer surface, with a heat-insulation material 211 having a heat-insulation property. The wall 210 is covered, at its inner surface, with a coat film 220 having a hydrophilic/hydrophobic property changing with temperature. The material, forming the heat-insulation material 211, preferably uses a plastic, particularly polycarbonate (having a thermal conductivity of 0.19 [W/m·K], 4.6 [$10^{-4}$ cal/cm·sec·° C.]), PPO (polyphenylene oxide) (having a thermal conductivity of 0.19 [W/m·K], 4.5 [$10^{-4}$ cal/cm·sec·° C.]), polypropylene (having a thermal conductivity of 0.12 [W/m·K], 2.8 [$10^{-4}$ cal/cm·sec·° C.]), ABS (having a thermal conductivity of 1.5-8.6 [$10^{-4}$ cal/cm·sec·° C.]), or the like. Meanwhile, besides plastics, suitably usable are those fibrous and containing air, e.g. glass, rubber, paper, cloth or felt, and those porous and containing air, e.g. ceramic or foaming polystyrol.

In back of the wall 210 (in right in FIG. 3), a temperature regulator 300 is provided to regulate the temperature of the coat film 220. In the side surface of the wall 210, a thermistor 140 is received to detect the temperature of the coat film 220. The coat film 220 is an example of the coat film referred in the invention. The temperature regulator 300 corresponds to an example of the temperature regulator referred in the invention.

Here, once suspending the explanation with reference to FIG. 3, explanation is now made on the coat film 220 and the temperature regulator 300.

In the embodiment, the temperature regulator 300 is applied which makes use of a Peltier device that releases and absorbs heat due to current supply.

Figure 4:
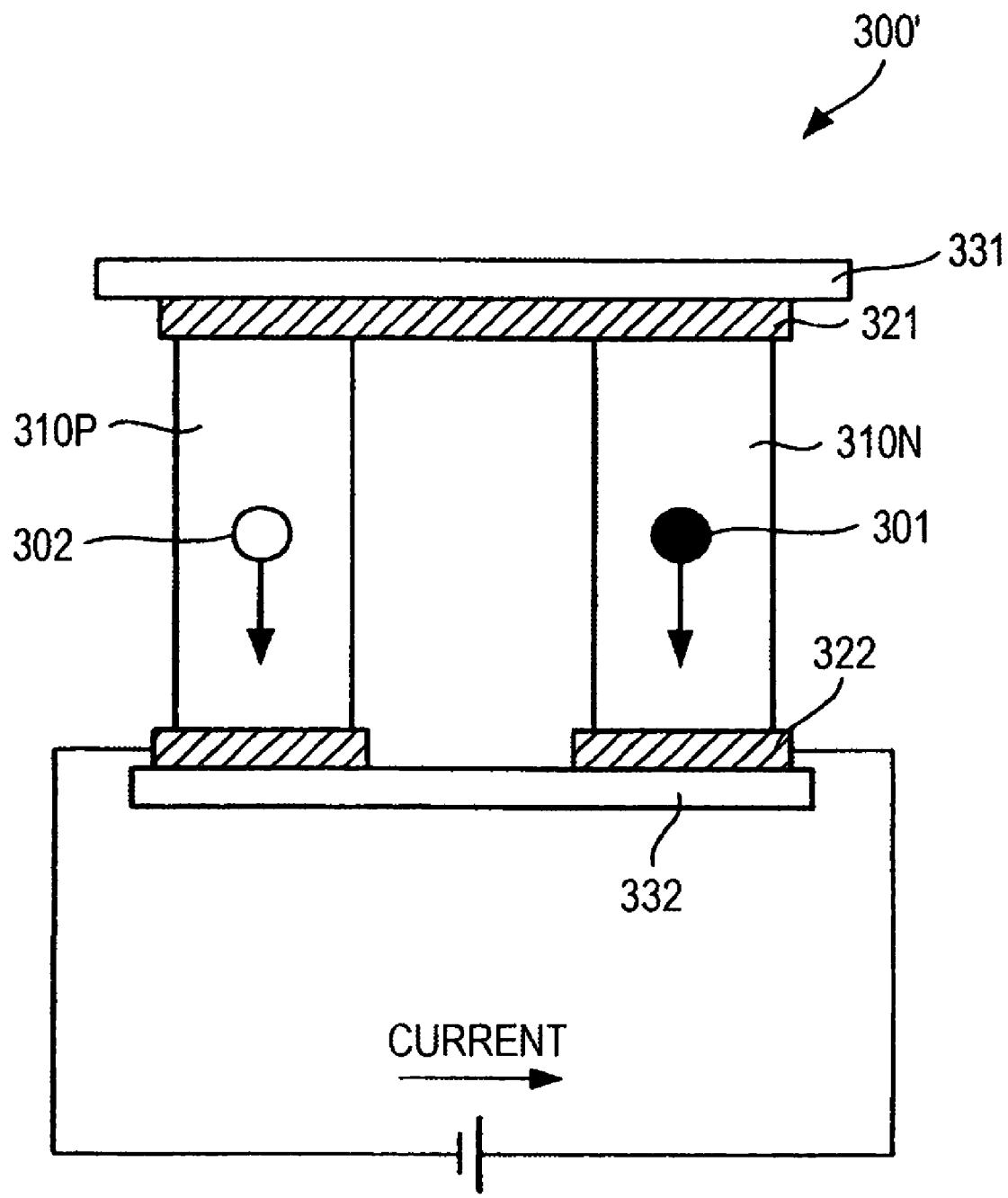
FIG. 4 is a basic concept figure of a temperature regulator to which a Peltier device is applied.

FIG. 4 is a basic concept figure of the temperature regulator 300' using a Peltier device.

In the temperature regulator 300', a P-type semiconductor 310P and an N-type semiconductor 310N are connected in series by electrodes 321, 322. The electrodes 321, 322 are respectively bonded with ceramic plates 331, 332. The electrodes 321, 322 are examples of the electrodes referred in the invention.

For example, in case a current is caused to flow from the N-type semiconductor 310N to the P-type semiconductor 310P, the electron 301 moves reverse in direction to the current flow. On this occasion, the electron 310, at the junction of between the upper electrode 321 and the N-type semiconductor 310N the electron 301, deprives of energy for the movement thereof to the lower electrode 322 through the N-type semiconductor 310N. Thus, the upper electrode 321 is cooled down because of energy deficiency. Conversely, the lower electrode 322 is heated up because the electron 301 releases the energy deprived from the upper electrode 321. On the side of the P-type semiconductor 310P, the role of energy transfer is played by the hole 302 in place of the electron 301. Likewise the N-type semiconductor 310N side, the upper electrode 321 is cooled while the lower electrode 322 is heated.

Meanwhile, when a current is caused to flow from the P-type semiconductor 310P to the N-type semiconductor 310N, energy is transferred reverse in direction to the above. The upper electrode 321 is heated while the lower electrode is cooled.

In this manner, by means of the temperature regulator 300' using the Peltier device, cooling/heat-release can be switched by changing the direction of current supply wherein the temperature can be regulated with accuracy by the supply amount of current. The temperature regulator 300 of this embodiment is applied with an alternate series connection of a plurality of P-type semiconductor members 310P and N-type semiconductor members 310N in the FIG. 4 temperature regulator 300'. The temperature regulator 300 is received in the liquid container 200 such that contact is provided between the FIG. 3 wall 210 and the ceramic plate 332 bonded on the upper electrode 321.

Meanwhile, in the embodiment, the coat film 220, covering over the inner surface of the wall 210, uses PNIPAAm (poly-N-isopropyl acrylamide polymer) having a hydrophilic/hydrophobic property changing with temperature.

FIG. 5 is a basic concept figure of PNIPAAm.

Figure 5B:
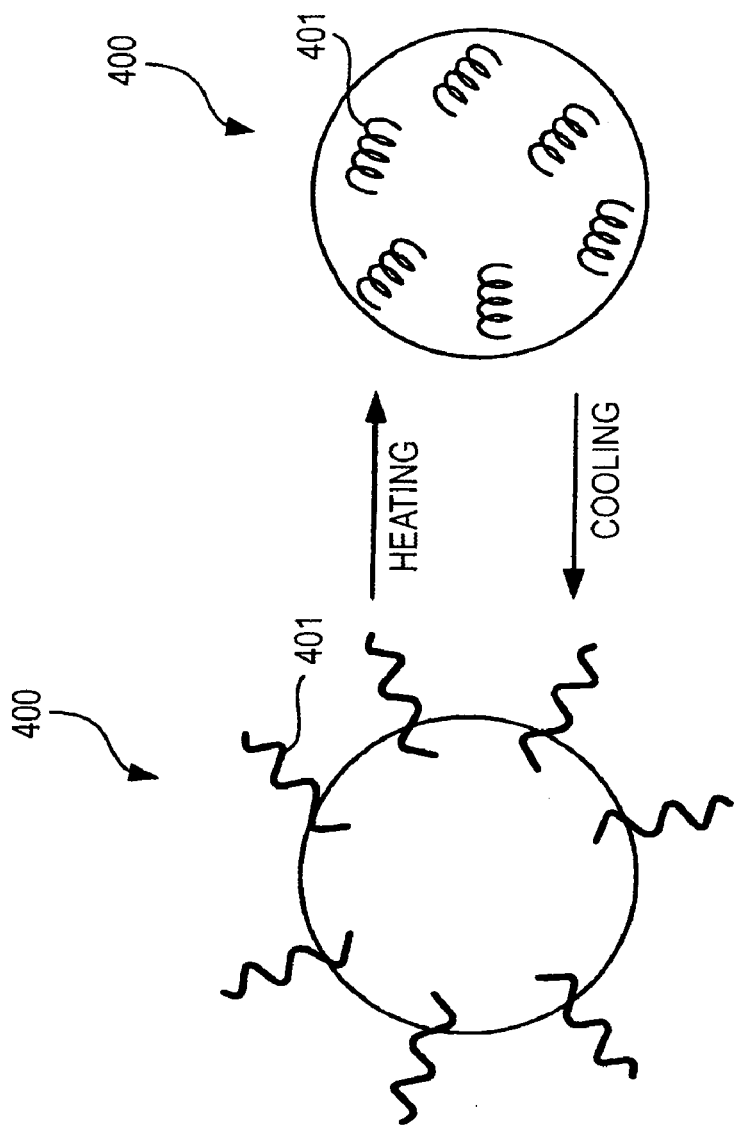
FIGS. 5A and 5B are basic concept figures of PNIPAAm.
Figure 5A:
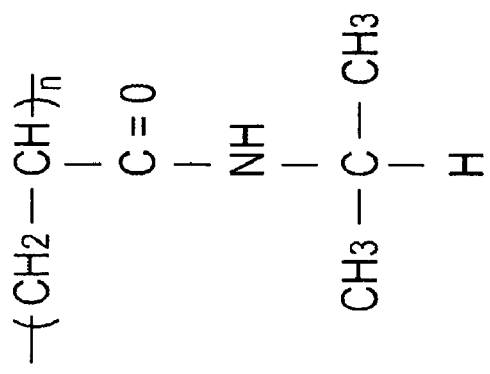

FIG. 5(A) shows a structural formula of PNIPAAm while FIG. 5(B) shows a concept for explaining the nature that hydrophilic/hydrophobic property changes in PNIPAAm.

PNIPAAm 400 has hydrophilic polymeric chains 401. PNIPAAm 400 is known as a substance having an affinity with water greatly changing at around 32° C. For example, when heated up to 37° C. or around, the hydrophilic polymeric chain 401 becomes bending to have hydrophobicity. Meanwhile, when cooled down to 32° C., hydrophilicity is provided because the surface is covered with the polymeric chain 401.

Referring back to FIG. 3, explanation is continued.

The inner surface of the wall 210 is covered with a coat film 220 formed of PNIPAAm 400 shown in FIG. 5. In case the film of PNIPAAm is thick, the interfacial effect reduces to insufficiently provide hydrophobicity. By conditioning the solution of a monomer solution or its solvent, the monomer is spread uniformly over the inner surface of the wall 210. By radiating an electron beam to conduct fixing and polymerization simultaneously, a PNIPAAm thin film is desirably produced uniformly to a thickness of approximately 30 nm.

Meanwhile, by the temperature regulator 300 using a Peltier device as shown in FIG. 4, the temperature of the coat film 220 is regulated to control the hydrophilic/hydrophobic property of the coat film 220. In the embodiment, because the wall 210 is formed of a material having a well thermal conductivity as noted before, the heat generated at the temperature regulator 300 can be efficiently forwarded to the coat film 220 and to the thermistor 140, thus regulating the temperature of the coat film 220 with accuracy. Furthermore, the wall 210 at its outer surface is covered with the heat-insulation material 211 having a low thermal conductivity as noted before, the temperature of the coat film 220 can be regulated with efficiency.

In the liquid container 200 thus structured, a water-based liquid 201 and an oil-based liquid 202 are contained that are different in optical refractive index from each other. In the embodiment, ethylene glycol (refractive index: 1.43) is applied as the water-based liquid 201 while organic solvent, isopyre (by Exxon, refractive index: 1.48) is applied for the oil-based liquid 202. The water-based liquid 201 is fallen under one example of the water-based liquid in the invention while the oil-based liquid 202 corresponds to one example of the oil-based liquid referred in the invention. Incidentally, the combination of ethylene glycol and isopyre has an advantage that the optical characteristic is maintained in the temperature environment of 0° C. or lower. Alternatively, water may be used for the water-based liquid and Tetralin be for the oil-based liquid, as a cheap combination of liquids.

In case the focus controller 112*a* causes a current to flow to the temperature regulator 300 in a direction reverse to the FIG. 4 case (i.e. in a direction of from the P-type semiconductor 310P to the N-type semiconductor 310N) according to an instruction from the FIG. 2 CPU 123, the upper ceramic plate 331 in contact with the wall 210 is heated up to heat the coat film 220, thus providing hydrophbicity to the coat film 220. At this time, the coat film 220 repels the water-based liquid 201 so that the boundary plane of between the water-based liquid 201 and the oil-based liquid 202 is changed, say, into a form as shown by the solid line in FIG. 3(A).

Figure 3A:
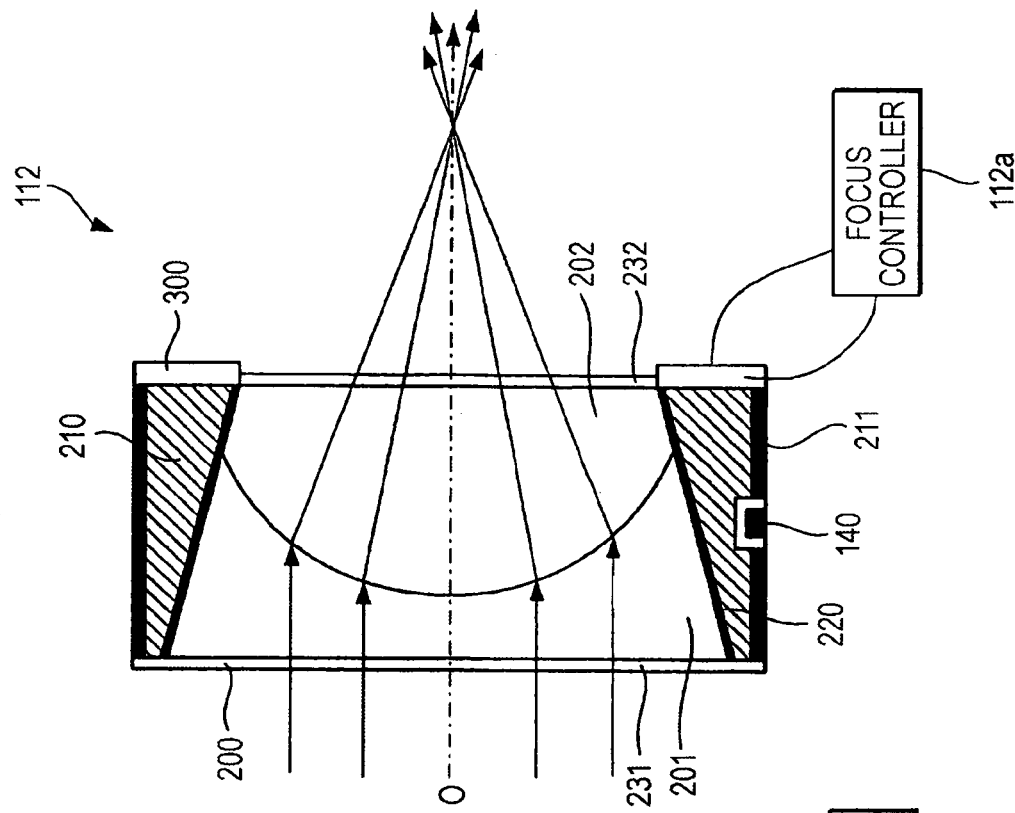
FIGS. 3A and 3B are schematic structural views of a focus lens.
Figure 3B:
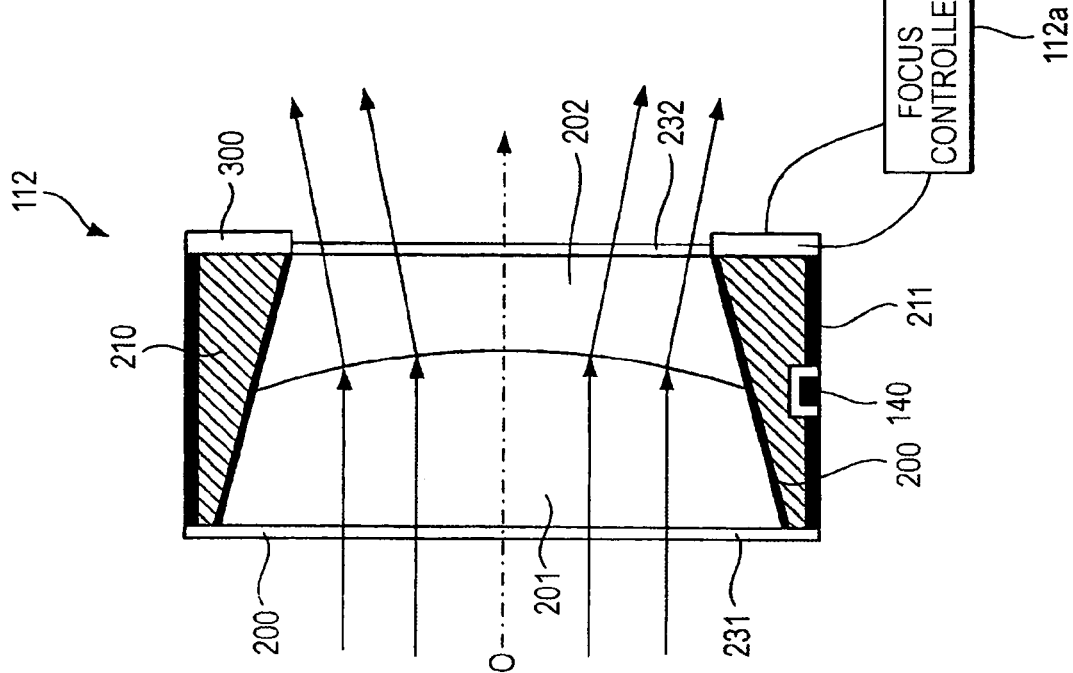

Meanwhile, in case the current supply to the temperature regulator 300 is reversed in direction from the state shown in FIG. 3A (i.e. into a direction of from the N-type semiconductor 310N to the P-type semiconductor 310P), the temperature regulator 300 cools down the coat film 220, thus providing hydrophilicity to the coat film 220. At this time, the coat film 220 becomes contact with the water-based liquid 201 so that the boundary plane of between the water-based liquid 201 and the oil-based liquid 202 is changed, say, into a form as shown by the solid line in FIG. 3(B).

By use of the focus lens 112, AF function can be realized in the following procedure.

At first, the focus controller 112*a* causes a current to flow to the temperature regulator 300, to heat up the coat film 220. As a result, the boundary plane of between the water-based liquid 201 and the oil-based liquid 202 is regulated to a form as shown in FIG. 3(*a*). This lens form corresponds to an INF position where focusing is on the subject in an infinity when the focus lens is moved along the optical axis. With the lens form corresponding to the INF position, the CCD 115 reads the light of from the subject and the AF detector section 124 acquires a contrast in the photographic signal. The acquired contrast is saved as the tentative maximum contrast.

Subsequently, the current supply by the focus controller 112*a* is regulated according to the temperature of the coat film 220 detected by the thermistor 140, thus cooling down the coat film 220 by a predetermined temperature. As a result, the lens form, formed by the oil-based liquid 201 and the oil-based liquid 202, is regulated in curve more intensely than that of FIG. 3(A). With this lens form, the contrast in the photographic signal is acquired. Furthermore, the contrast in this time is compared with the saved maximum contrast. When the contrast in this time is greater than the saved contrast, the contrast in this time is saved in place of the saved contrast.

Until the contrast in this time becomes greater than the saved contrast, continuously executed is the operation including cooling down the coat film 220 by a predetermined temperature, regulating the lens form to a more intense curve sequentially, acquiring the contrast value of the photographic signal and comparing the contrast in this time (maximum contrast in those up to the last time) with the saved contrast.

Usually, because the contrast in the photographic signal increases as the focal condition is neared. When the lens is changed gradually from the form corresponding to the INF position shown FIG. 3(A) to a form corresponding to the NEAR position shown FIG. 3(B) (lens position for focusing to a near subject), the lens form first approximates gradually to the focal state and the contrast increases. After the lens form passes the focal state, the contrast gradually decreases. In this manner, because the contrast changes in a mountainous form, it is possible to determine a focal state from a lens form that the contrast changes in tendency from increasing into decreasing. The method of detecting a focal state, by acquiring a change point of the contrast from an increasing trend into a decreasing trend, has been applied as a "mountain-climbing scheme AF" in the related art.

By providing the focus lens 112 with a form determined as a focal state, focusing can be automatically made on the subject without any movement of the focus lens 112.

As compared to the related-art digital camera using the related-art motor or cam mechanism, the digital camera 100 of this embodiment requires less components in realizing AF and zoom functions but is easier to assemble, thus reducing the manufacture cost. Meanwhile, because of no need to move the lens, the consumption power can be reduced in realizing the AF and zoom functions. In addition, focusing can be made on the subject at high speed.

Meanwhile, when changing the form of the boundary plane of between the water-based liquid 201 and the oil-based liquid 202, current is satisfactorily supplied to the temperature regulator 300. Because of no need to release charges into the liquid, there encounters no trouble that the electric decomposition occurs in the liquid and causes bubbles. As a result, the transmittance of light is maintained over a long term, thus improving the life of the digital camera 100.

Completing the explanation on the first embodiment of the invention, explanation is now made on a second embodiment of the invention. The second embodiment of the invention is the application of the image-taking apparatus of the invention to an endoscope, thus having an internal structure nearly similar to that of the digital camera of the first embodiment. Accordingly, the similar elements to those of the first embodiment are attached with the same reference numerals to omit the explanations thereof, in order to explain only the differences from the first embodiment.

Figure 6:
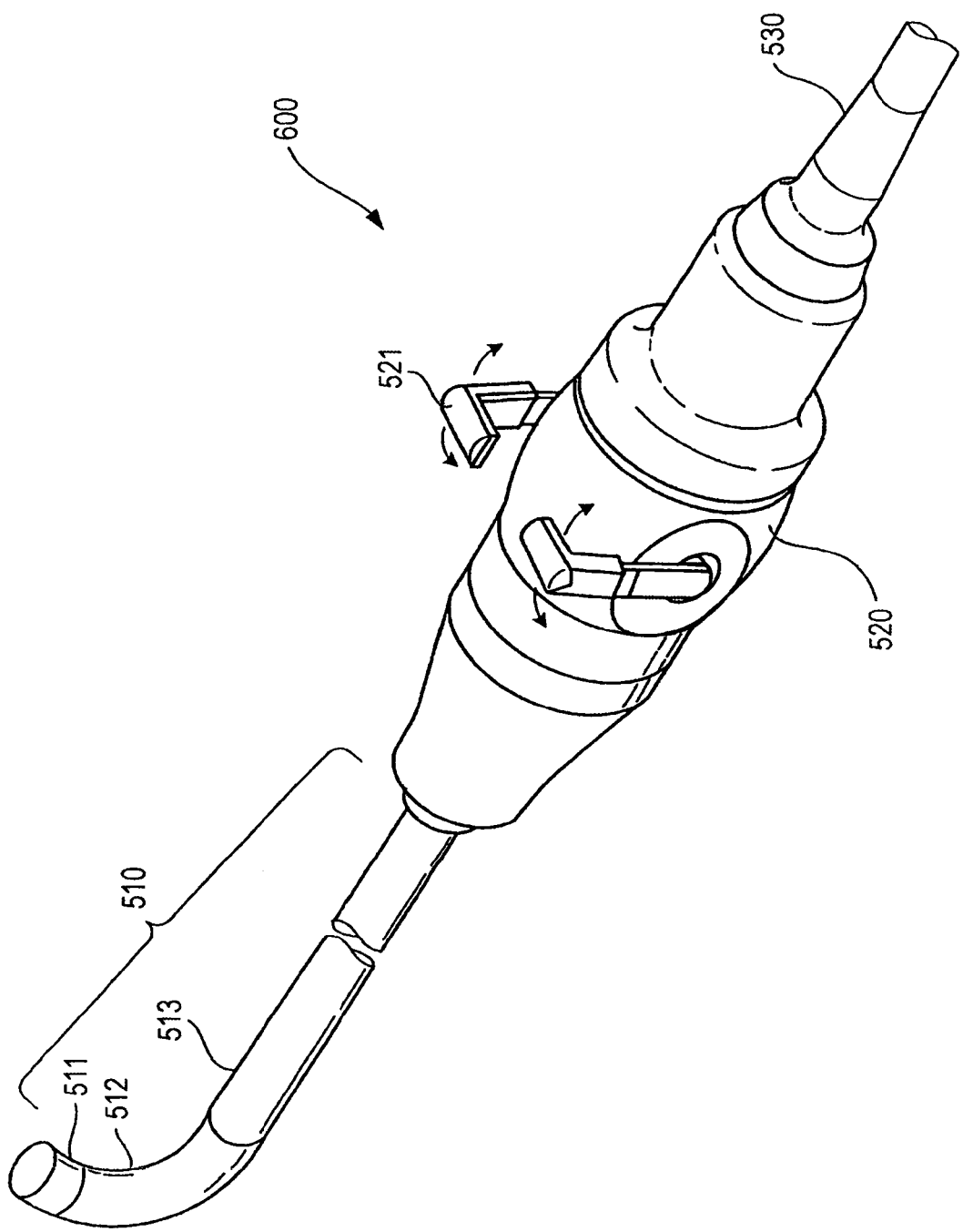
FIG. 6 is a schematic structural view showing a tip region of an endoscope to which a second embodiment of the invention is applied.

FIG. 6 is a schematic structural view showing a tip of an endoscope 600 to which the second embodiment of the invention is applied.

The endoscope 600 has, at its tip, an insertion part 510, an operation part 520 connected to and for operating the insert part 510, and a cord 530 connected with a control section 540 (see FIG. 7) and a light source (not shown).

The insertion part 510 is structured with a tip portion 511 having an image-taking apparatus and an illumination window, a bendable portion 512 capable of bending up, down, left and right depending upon the operation on the operation part 520, and an elongate introducing part 513 connected to the operation part 520.

The operation part 520 is provided with an operator 521 which the user is allowed to operate for bending the insertion part 510 at its bendable portion 512. The movement of the operator 521 pushes and pulls a pair of wires received in the insertion part 510, to cause a bending in the bendable portion 512 thereby positioning the tip portion 511 in a desired direction.

The cord 530 is connected with a light source for illuminating light through the illumination window provided in the insertion part 510, and a control section 540 for controlling the endoscope 600 and image-processing the photographic image taken at the insertion part 510. A bundle of optical fibers, called a light guide, is arranged in the insertion part 510, the operation part 520 and the cord 530 so that the light emitted from the light source can be introduced to the tip portion 511 through the light guide where it is illuminated through the illumination window. Meanwhile, the control section 540 is connected with a display 15, to display a photographic image processed.

Figure 7:
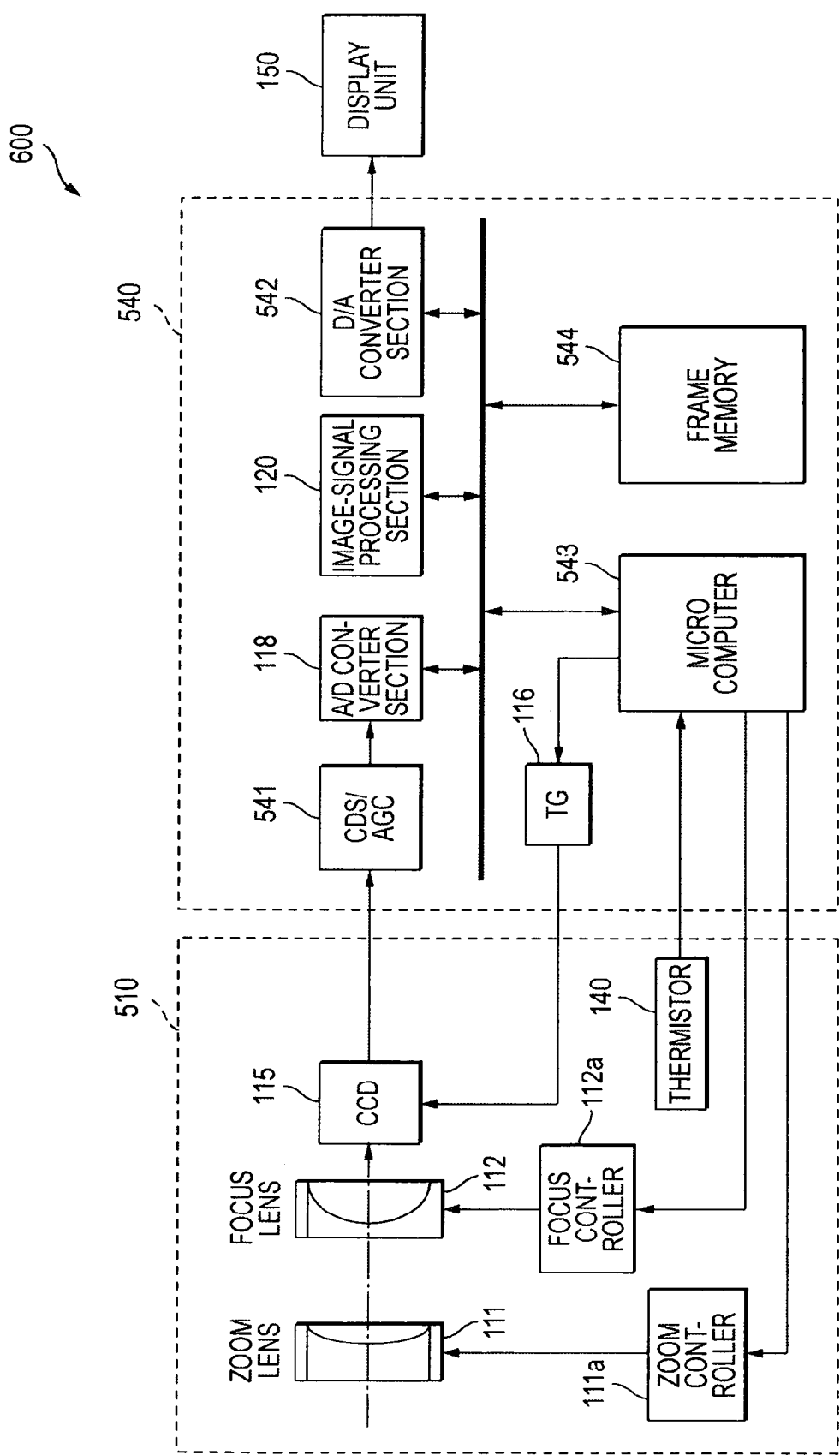
FIG. 7 is an internal block diagram of the endoscope.

FIG. 7 is an internal block diagram of the endoscope 600.

The insertion part 510 is provided with a zoom lens 111, a zoom controller 111a, a focus lens 112, a focus controller 112a, a CCD 115 and a thermistor 140, similarly to those of the FIG. 2 digital camera 100.

Meanwhile, the control section 540 is provided with a CDS/AGC 541 for gain control, a D/A converter section 542 for converting image data into an analog signal for the display unit 150, a microcomputer 543 for controlling the entire of the endoscope 600 and detecting a contrast in a subject during AF execution, a frame memory 544 for temporarily storing image data and so on, in addition to the TG 116, the A/D converter section 118 and the image-signal processing section 120 that are similar to those of the FIG. 2 digital camera 100. Furthermore, a display unit 105 is connected.

The zoom lens 111 and the focus lens 112 are regulated in form according to the instruction from the microcomputer 543. The photographic signal generated at the CCD 115 is forwarded to the CDS/AGC 541 through the operation part 520 and cord 530. The photographic signal, subjected to correlated-double sampling and auto-gain control in the CDS/ABGC 541, is converted into digital image data in the A/D converter section 118 and subjected to various image processes in the image-processing section 120, then being forwarded to the D/A converting section 542 through the frame memory 544. Thus, the display unit 150 displays an image the image data represents.

Size reduction is strongly desired for the endoscope because to be inserted in the body cavity. The embodiment can realize both the size reduction of and the zoom and focus functions of the apparatus because of no need to move the zoom lens 111 and focus lens 112 in the apparatus.

Here, although the above explained the example that two kinds, water-based and oil-based liquids are contained in the liquid container, the liquid container referred in the invention may contain three kinds or more liquids.

Meanwhile, although the above explained the example that the optical device in the invention is applied to the focus and zoom lenses, the optical device of the invention may be applied to a tele-converter or wide-converter.

According to the invention, an optical device, optical unit and imager can be provided that the refractive power can be changed freely while suppressing the performance from deteriorating.

The entire disclosure of each and every foreign patent application from which the benefit of foreign priority has been claimed in the present application is incorporated herein by reference, as if fully set forth.

What is claimed is:

1. An optical device comprising:
    a liquid container that contains water-based liquid and oil-based liquid that are different in refractive index from each other and immiscible with each other to have respective optical-transmission properties so that light can transmit in a predetermined optical-axis direction;
    a coat film that covers at least part of an inner surface of the liquid container and has a hydrophilic/hydrophobic property changing with temperature; and
    a temperature regulator that regulates temperature of the coat film.

2. An optical device according to claim 1,
    wherein the liquid container comprises:
    a first portion arranged in contact with the coat film and comprising a material having a comparatively higher thermal conductivity; and
    a second portion covering over an outer surface of the first portion and comprising a material having a comparatively lower thermal conductivity.

3. An optical device according to claim 1,
    wherein the temperature regulator comprises:
    a Peltier device that releases and absorbs heat due to current supply; and
    an electrode that supplies a current to the Peltier device.

4. An optical device according to claim 1,
    wherein the coat film comprises poly-N-isopropyl acrylamide polymer (PNIPAAm).

5. An optical unit comprising:
    a liquid container that contains water-based liquid and oil-based liquid that are different in refractive index from each other and immiscible with each other to have respective optical-transmission properties so that light can transmit in a predetermined optical-axis direction;
    a coat film that covers at least part of an inner surface of the liquid container and has a hydrophilic/hydrophobic property changing with temperature;
    a temperature regulator that regulates temperature of the coat film; and
    a control section that controls temperature of the coat film regulated by the temperature regulator.

6. The optical unit according to claim 5,
    wherein the control section controls current supply to the temperature regulator according to detected temperature of the coat film.

7. An imager comprising:
    a liquid container that contains water-based liquid and oil-based liquid that are different in refractive index from each other and immiscible with each other to have respective optical-transmission properties so that light can transmit in a predetermined optical-axis direction;

a coat film that covers at least part of an inner surface of the liquid container and has a hydrophilic/hydrophobic property changing with temperature;

a temperature regulator that regulates temperature of the coat film;

a control section that controls temperature of the coat film regulated by the temperature regulator; and an imaging section, in which light of from a subject traveled through the water-based liquid and the oil-based liquid are focused, that generates an image signal corresponding to the light of from the subject.

* * * * *